Oct. 7, 1930.  T. RITCHIE  1,777,577
STOCK WATERER
Filed Dec. 19, 1927  2 Sheets-Sheet 2

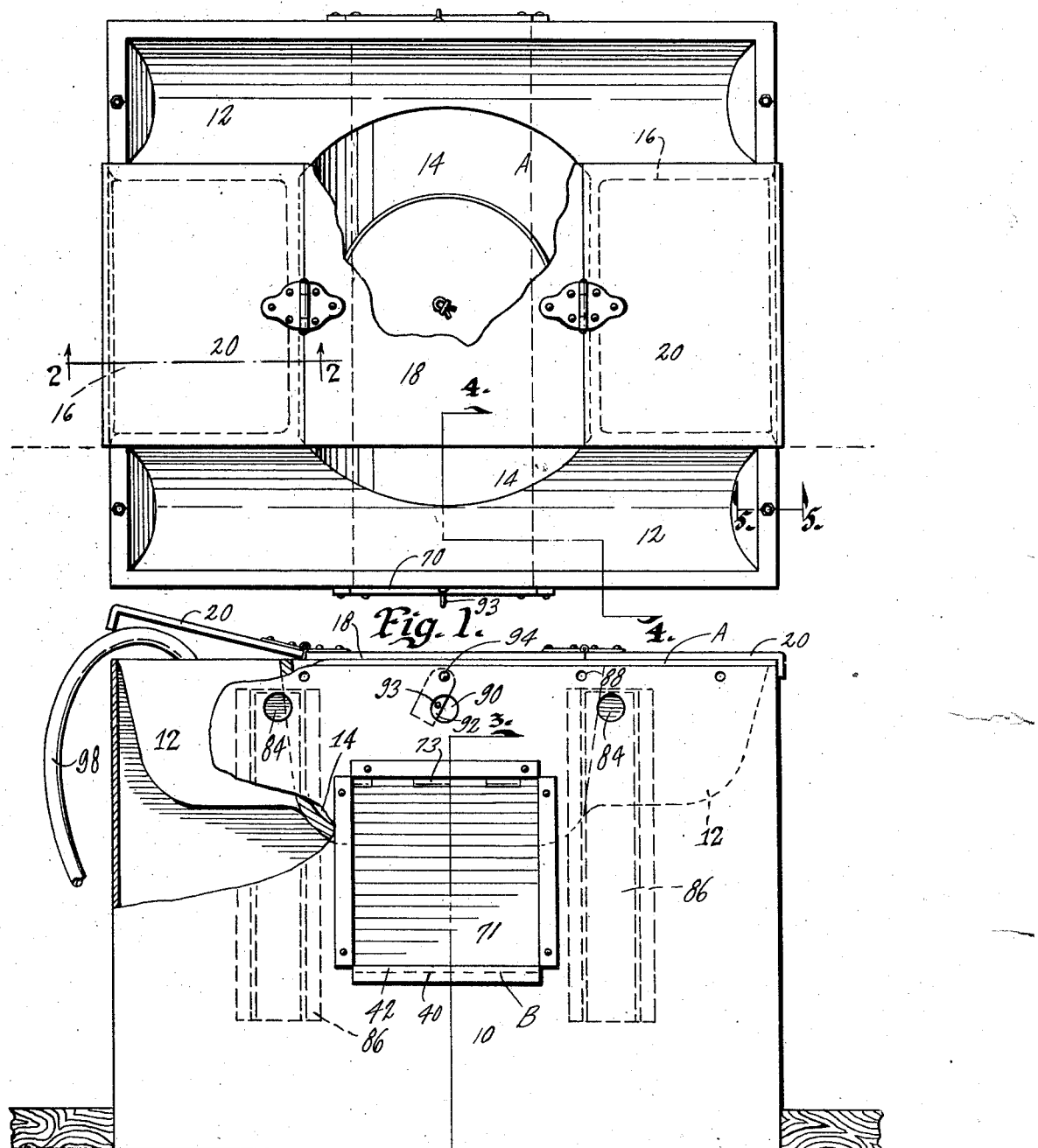

Witness
L. E. Long.

Inventor
Thomas Ritchie
by Bair & Freeman Attorneys

Patented Oct. 7, 1930

1,777,577

UNITED STATES PATENT OFFICE

THOMAS RITCHIE, OF OSKALOOSA, IOWA, ASSIGNOR TO RITCHIE MANUFACTURING COMPANY, OF MARSHALLTOWN, IOWA, A CORPORATION OF IOWA

STOCK WATERER

Application filed December 19, 1927. Serial No. 241,013.

The object of my invention is to provide a stock waterer adapted to be used for cattle, horses and hogs, the parts of the waterer being of simple, durable, and comparatively inexpensive construction.

A further object is to provide such a waterer in the form of a casing having at its top a watering trough for horses and cattle and below the trough just mentioned a second trough adapted to be used for the watering of hogs, access to the second trough being had through an opening in the side of the casing. In this manner the watering trough for the horses and cattle is high enough so that the hogs cannot get into it and dirty up the water while provision is made for watering the hogs as well as the horses and cattle.

Still a further object is to provide means within the casing for keeping the water warm in winter time.

Still a further object is to provide the upper trough with openings so that access can be had through them to the space within the casing below the trough so that heating devices may be positioned therein.

Still another object is to provide means for admitting warm air to the drinking compartments for the hogs, this same means being adapted to admit air to the heating devices each time a hog drinks.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a plan view of my improved type of stock waterer.

Figure 2 is a side elevation of the same parts being broken away and other parts being shown on the line 2—2 of Figure 1.

Figure 3:
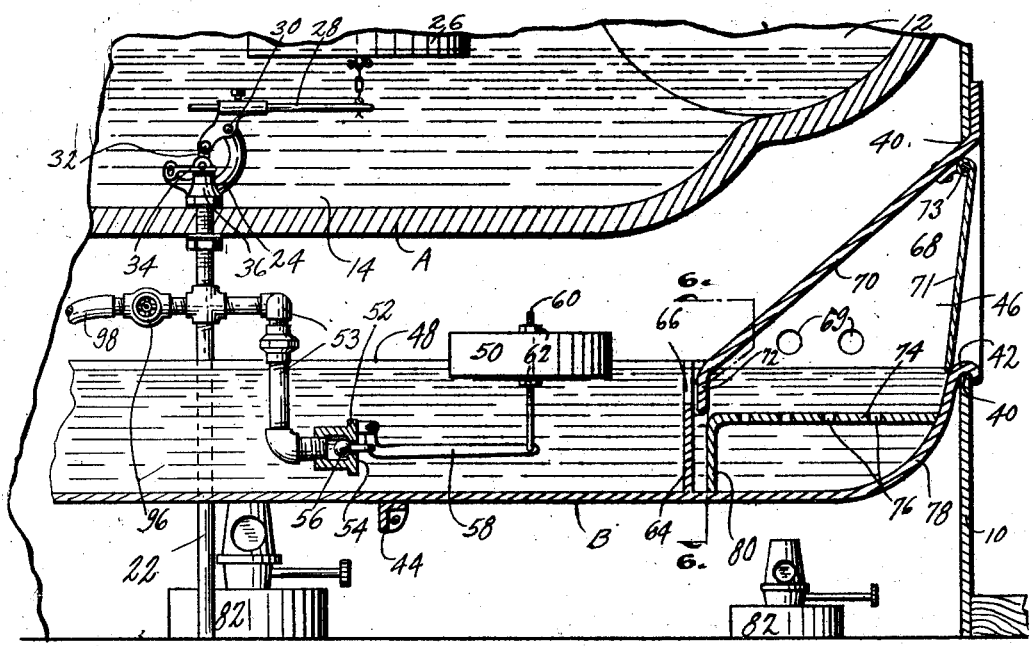
Figure 3 is an enlarged sectional view taken on the line 3—3 of Figure 2.

On the accompanying drawings I have used the reference numeral 10 to indicate a casing which is substantially rectangular in shape and is preferably formed of sheet metal. The casing 10 rests on the ground and is designed to support the cattle and hog drinking troughs of my invention.

The cattle drinking trough is indicated generally by the reference character A and comprises a pair of drinking compartments 12 substantially equal in length to the casing 10 and positioned at each side thereof. A float compartment 14 extends between the drinking compartments 12 and communicates with them as clearly illustrated in Figure 3 of the drawings.

The float compartment 14 is considerably shorter than the casing 10 whereby a pair of openings 16 are formed for gaining access to the casing 10 below the drinking trough A. The float compartment 14 is covered by a cover member 18 merely resting on the ends of the float compartment and a pair of doors 20 are hinged to the cover member 18. The doors 20 are designed to cover the openings 16 to prevent the escape of warm air from the casing 10.

A supply line 22 is provided for supplying the drinking compartments 12 with water. Admission of water to the drinking compartments 12 is controlled by a float valve structure 24, the valve being opened and closed by a float 26 positioned in the float compartment 14. The connection between the valve 24 and the float 26 is through an arm 28 pivoted at 30 and connected by a link 32 to a plug 34 adapted to engage a valve seat 36 when the float 26 is raised to a predetermined position.

Figure 5:
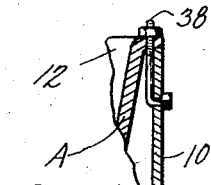
Figure 5 is a detail sectional view taken on the line 5—5 of Figure 1.
Figure 6:
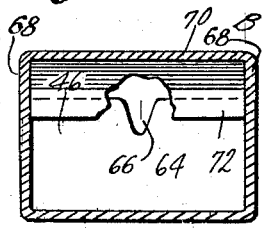
Figure 6 is a sectional view through the hog waterer taken on the line 6—6 of Figure 3.

The cattle drinking trough A is held in position with relation to the casing 10 by means of bolts 38. This connection is clearly illustrated in Figure 5 of the drawings.

In opposite sides of the casing 10 are openings 40 positioned just below the cattle drinking trough A. A hog drinking trough B is positioned within the casing 10 in position for the hogs to drink from the trough B through the openings 40. The trough B includes hook portions 42 at each end adapted to engage the bottoms of the openings 40. In Figure 3, only one end of the trough B is illustrated, the other end being a duplicate of the one shown. An angle bar 44 extends from one end of the casing 10 to the other and supports the trough B at its center. The drinking trough B includes drinking compartments 46 and a float compartment 48. A float 50 is positioned in the float compartment 48 and is operatively associated with a float valve 52 for the purpose of admitting water from the supply line 22 to the drinking trough B. The float valve 52 comprises a valve seat 54, valve 56 cooperating therewith and a lever 58. The lever 58 is adjustably connected by a rod 60 and nuts 62 to the float 50.

It will be noted (Figure 3) that the pipe 22 extends up on one side of the trough B and is connected to the valve 52 by piping 53 extending down into the water in the trough B. This construction obviates the necessity of extending the piping 53 up through the bottom of the trough B and eliminates the use of gaskets or other sealing means. The float valve is thus much more conveniently removed for repair or replacement.

In the drinking trough B are partitions 64 extending above the level of the water. The partitions 64 are provided with V grooves 66 through which the water flows from the float compartment 48 to the drinking compartments 46. This construction prevents mud which the hogs get into their water from getting into the float compartment 48.

Each opening 40 is provided with shields comprising sides 68 and a top 70. The top 70 has a portion 72 extending downwardly into the water in the drinking trough B. Openings 69 are provided for admitting warm air to the drinking compartment 46 to keep the water therein warmed. Each opening 40 is provided with a door 71 hinged as at 73 to the shield 70. This door prevents cold air from entering the casing 10 through the openings 69 and also keeps trash and snow from blowing into the drinking compartments 46.

The doors 71 in conjunction with the openings 69 also serve an additional purpose. Each time a hog drinks the door 71 is opened and allows a fresh supply of oxygen to enter the casing 10 through the openings 69 which clears the casing 10 of stagnant gases and allows the heating lamps 82 therein to function better and burn a little higher. It is therefore obvious that a greater number of hogs drinking will furnish a greater amount of oxygen through the openings 69 and the heat in proportion to the consumption of water will thus be regulated.

Within each drinking compartment 46 of the trough B is a false bottom 74. The false bottoms 74 are perforated as at 76 so that mud getting into the water in the compartments 46 will settle through these openings and onto the bottoms of the compartments. This mud can be raked out of the trough B due to the curved end walls 78 thereof. A downwardly extending lip 80 is provided on each false bottom 74 for this mud scraping operation.

Figure 4:
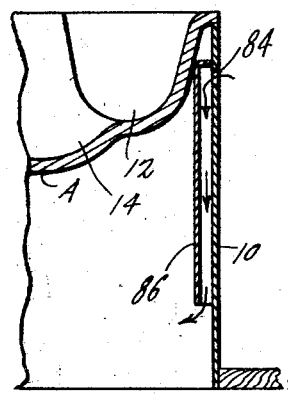
Figure 4 is a sectional view taken on the line 4—4 of Figure 1.

Within the casing 10 one or more of the lamps 82 or other heating devices may be provided for the purpose of keeping the water in the troughs A and B in warm condition during cold weather. Ventilation is provided for the lamps 82 through openings 84 positioned around the upper edge of the casing 10. Oxygen consumed by the lamps 82 is provided by the entrance of air through these openings 84 which travels down a passageway provided by a shield 86 secured behind each opening 84 as clearly illustrated in Figure 4. The shields 86 discharge the air near the ground. The gases of combustion arising from the lamps 82 are discharged through small openings 88 around the upper edge of the casing 10. Several of the openings 88 are provided on each side of the casing 10 sufficient for the escape of gases under ordinary conditions. One large discharge opening 90 on each side of the casing is provided having an adjustable damper 92 pivoted on a rivet 94. The damper 92 may be swung to position covering more or less of the area of the opening 90.

Within the casing 10 I provide a valve 96 and a hose 98 connected to the supply line 22 and controllable by the valve. The hose 98 may be coiled within the casing 10 or may be extended through one of the openings 16 as illustrated in Figure 2 for the purpose of filling a barrel or otherwise getting water for other purposes desired.

Figure 7:
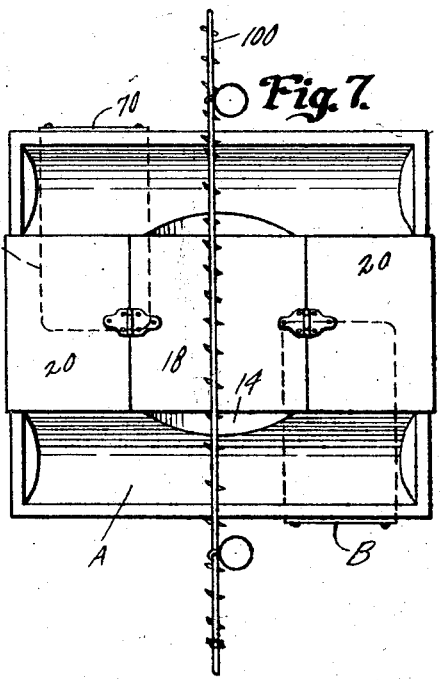
Figure 7 illustrates a modified form of my invention in which two separate watering troughs for the hogs are provided.

In Figure 7 I have illustrated my stock waterer with two separate hog waterer troughs B positioned diagonally. This arrangement allows of placing the waterer in a fence as shown, the fence being indicated as 100. Cattle and horses on both sides of the fence 100 may drink from the upper watering trough A and hogs on each side of the fence 100 can drink from the trough B on their respective side of the fence.

Changes may be made in the construction and arrangement of the various parts of my invention, without departing from the real spirit and purpose thereof and it is my intention to cover by my claims, any modified forms of structure or use of mechanical equivalents which may be reasonably included within their scope.

I claim as my invention:

1. In a stock waterer, a casing, a trough suspended therein comprising a pair of drinking compartments at the sides of said casing and extending the length thereof, a float compartment between said drinking compartments and shorter than the length thereof whereby an opening is formed between the end of the float compartment and an end of the casing whereby access may be had to said casing below said trough, a second trough in said casing below the first trough, an opening in the side of said casing for admitting stock to drink from said second trough, a shield extending from the top of said opening and back into the water of said second trough, a door for said opening and openings in said shield for affording communication between the second trough and the interior of the casing.

2. A waterer of the character described comprising a casing, a watering trough in the top thereof, a watering trough below the first mentioned trough and accessible from the side of the casing and means for normally closing said second trough, said means serving to admit heated air from the casing to the second mentioned trough when said means is closed.

3. In a stock waterer, a casing, a trough suspended therein, a second trough in said casing below the first trough, an opening in the side of said casing for admitting stock to drink from said second trough, a shield extending from the top of said opening and back into the water of said second trough, a door for said opening and openings in said shield for affording communication between the second trough and the interior of the casing.

4. In a watering trough construction, a casing, a trough therein, an opening in said casing for admitting stock to drink from the trough, a hinged cover member for said opening, a shield interposed between the trough and the interior of the casing and openings in said shield to allow communication between the trough and the interior of the casing when said cover member is in closed position and to allow air outside the casing to enter therein when said cover member is in opened position.

Des Moines, Iowa, October 14, 1927.

THOMAS RITCHIE.